(12) United States Patent  
Schmitz

(10) Patent No.: US 11,674,337 B2  
(45) Date of Patent: Jun. 13, 2023

(54) INSIDE DOOR OPENER ARRANGEMENT

(71) Applicant: Dr. Ing. h.c. F. Porsche Aktiengesellschaft, Stuttgart (DE)

(72) Inventor: Stefan Schmitz, Stuttgart (DE)

(73) Assignee: Dr. Ing. h. c. F Porsche AG, Stuttgart (DE)

( * ) Notice: Subject to any disclaimer, the term of this patent is extended or adjusted under 35 U.S.C. 154(b) by 453 days.

(21) Appl. No.: 16/740,867

(22) Filed: Jan. 13, 2020

(65) Prior Publication Data  
US 2020/0232260 A1 Jul. 23, 2020

(30) Foreign Application Priority Data

Jan. 18, 2019 (DE) .................... 10 2019 101 293.7

(51) Int. Cl.
| | |
|---|---|
| E05B 79/06 | (2014.01) |
| E05B 85/12 | (2014.01) |
| E05B 85/02 | (2014.01) |
| E05B 79/04 | (2014.01) |
| B60J 5/04 | (2006.01) |

(52) U.S. Cl.  
CPC .............. *E05B 79/06* (2013.01); *B60J 5/0416* (2013.01); *E05B 79/04* (2013.01); *E05B 85/02* (2013.01); *E05B 85/12* (2013.01); *E05Y 2900/531* (2013.01); *Y10S 292/53* (2013.01); *Y10S 292/54* (2013.01); *Y10T 292/57* (2015.04)

(58) Field of Classification Search  
CPC ........ E05B 79/06; E05B 85/12; E05B 63/006; B60J 5/0468; Y10S 292/60; Y10T 292/57; Y10T 292/53; Y10T 292/54  
See application file for complete search history.

(56) References Cited

U.S. PATENT DOCUMENTS 2,753,201 A * 7/1956 Teetor .................... E05C 3/162  
292/64  
4,580,822 A * 4/1986 Fukumoto ............... E05B 85/12  
292/DIG. 31  
(Continued)

FOREIGN PATENT DOCUMENTS

| CN | 203654940 | 6/2014 |
|---|---|---|
| CN | 206487271 | 9/2017 |

(Continued)

OTHER PUBLICATIONS

German Examination Report dated Nov. 7, 2019.  
Great Britain Combined Search and Examination Report dated Jul. 14, 2020.

*Primary Examiner* — Christine M Mills  
*Assistant Examiner* — Faria F Ahmad  
(74) *Attorney, Agent, or Firm* — Gerald E. Hespos; Michael J. Porco

(57) ABSTRACT

An inside door opener arrangement (99) for a vehicle door has a housing (5) containing a lever (3) that is pivotable about an axis (4) and is connectable to a door lock. The housing (5) has a first fastening element (6) for fastening the housing (5) to a door lining (1) and a second fastening element (9) for fastening the housing (5) to a door structure (11). A sleeve (13) is provided for the door-specific bridging of the distance between the second fastening element (9) and the door structure (11). The sleeve is connected to the housing (5) in the region of the second fastening element (9).

9 Claims, 2 Drawing Sheets

(56) References Cited

U.S. PATENT DOCUMENTS

| | | | | |
|---|---|---|---|---|
| 4,892,342 | A * | 1/1990 | Newman | E05B 79/06 |
| | | | | 292/DIG. 64 |
| 5,064,228 | A * | 11/1991 | Bisbing | E05C 9/08 |
| | | | | 292/DIG. 60 |
| 5,226,259 | A * | 7/1993 | Yamagata | E05B 79/20 |
| | | | | 49/502 |
| 5,238,276 | A | 8/1993 | Burns | |
| 5,248,175 | A * | 9/1993 | Burns | E05B 79/06 |
| | | | | 292/DIG. 31 |
| 5,282,657 | A * | 2/1994 | Clinch | E05B 85/12 |
| | | | | 292/DIG. 31 |
| 5,284,373 | A * | 2/1994 | Watson | E05B 79/06 |
| | | | | 292/DIG. 64 |
| 5,340,174 | A * | 8/1994 | Bender | E05B 79/06 |
| | | | | 292/DIG. 31 |
| 5,377,450 | A * | 1/1995 | Varajon | E05B 85/12 |
| | | | | 296/146.7 |
| 5,499,851 | A * | 3/1996 | Mitchell | E05B 79/06 |
| | | | | 292/DIG. 31 |
| 5,560,659 | A * | 10/1996 | Dault | E05B 77/06 |
| | | | | 292/336.3 |
| 6,039,366 | A * | 3/2000 | Lewis | E05B 85/18 |
| | | | | 292/DIG. 64 |
| 6,059,329 | A * | 5/2000 | Spitzley | E05B 85/16 |
| | | | | 292/DIG. 31 |
| 6,886,874 | B2 * | 5/2005 | Abe | E05B 81/78 |
| | | | | 296/146.1 |
| 7,344,168 | B2 * | 3/2008 | Matsubara | E05B 79/06 |
| | | | | 292/336.3 |
| 7,404,588 | B2 * | 7/2008 | Gabsch | E05B 85/12 |
| | | | | 296/146.7 |
| 8,443,552 | B2 * | 5/2013 | Kinoshita | B60J 5/045 |
| | | | | 49/502 |
| 8,720,118 | B2 * | 5/2014 | Meyers | E05B 77/04 |
| | | | | 49/460 |
| 9,248,722 | B2 | 2/2016 | Gillay et al. | |
| 10,024,085 | B2 * | 7/2018 | Burns | E05B 79/06 |
| 10,435,922 | B2 * | 10/2019 | Kovie | E05B 85/12 |
| 2003/0141725 | A1 * | 7/2003 | Tsai | E05B 15/02 |
| | | | | 292/357 |
| 2007/0131003 | A1 * | 6/2007 | Williamson | E05B 79/06 |
| | | | | 70/208 |
| 2011/0025074 | A1 * | 2/2011 | Reznar | E05C 1/145 |
| | | | | 292/336.3 |
| 2015/0291012 | A1 * | 10/2015 | Gillay | B60R 13/0243 |
| | | | | 403/16 |
| 2015/0368936 | A1 * | 12/2015 | Chappuis | B60J 5/0416 |
| | | | | 49/460 |
| 2016/0010368 | A1 | 1/2016 | Tanoguchi et al. | |
| 2017/0009500 | A1 * | 1/2017 | Do | E05C 3/122 |
| 2019/0078358 | A1 | 3/2019 | Heyduck et al. | |

FOREIGN PATENT DOCUMENTS

| | | |
|---|---|---|
| CN | 209293600 | 8/2019 |
| DE | 43 13 739 | 11/1994 |
| DE | 196 11 752 | 10/1997 |
| DE | 101 52 953 | 4/2003 |
| DE | 20 2014 105 691 | 4/2015 |
| EP | 1 479 566 | 5/2004 |
| EP | 3 456 906 | 3/2019 |
| KR | 2001-0059809 | 7/2001 |
| WO | 2014/122835 | 8/2014 |

* cited by examiner

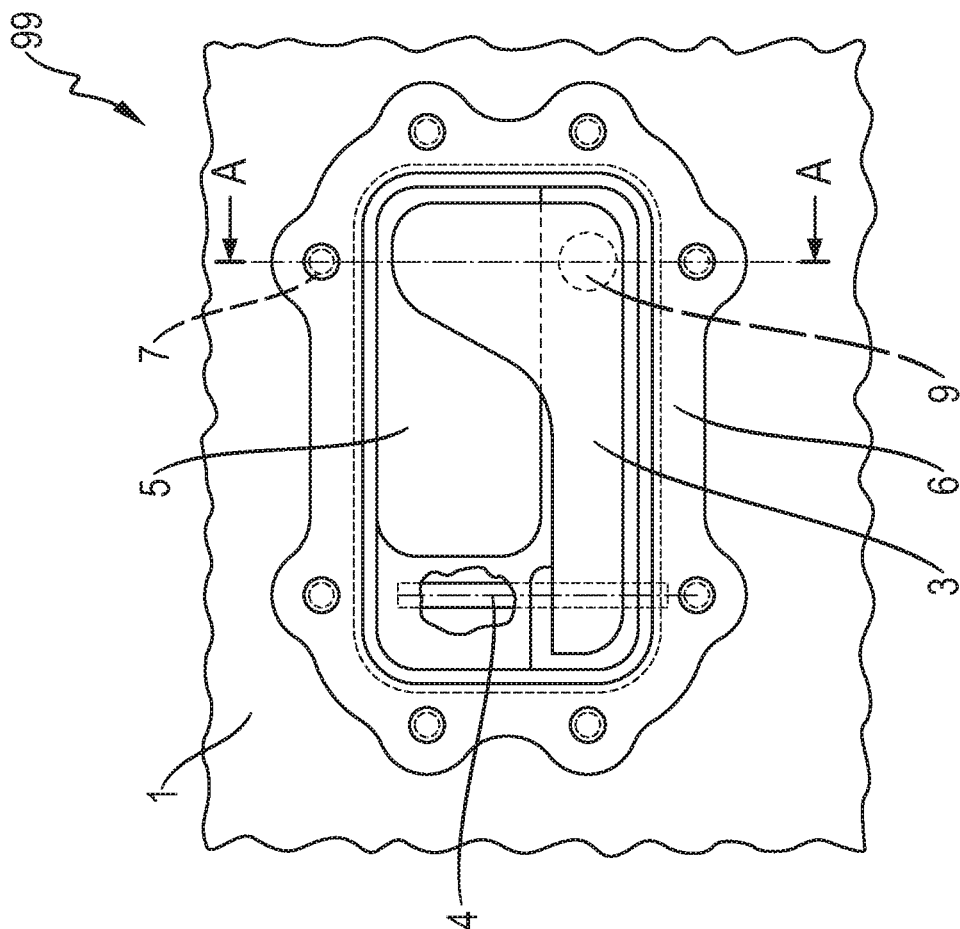
Fig. 2
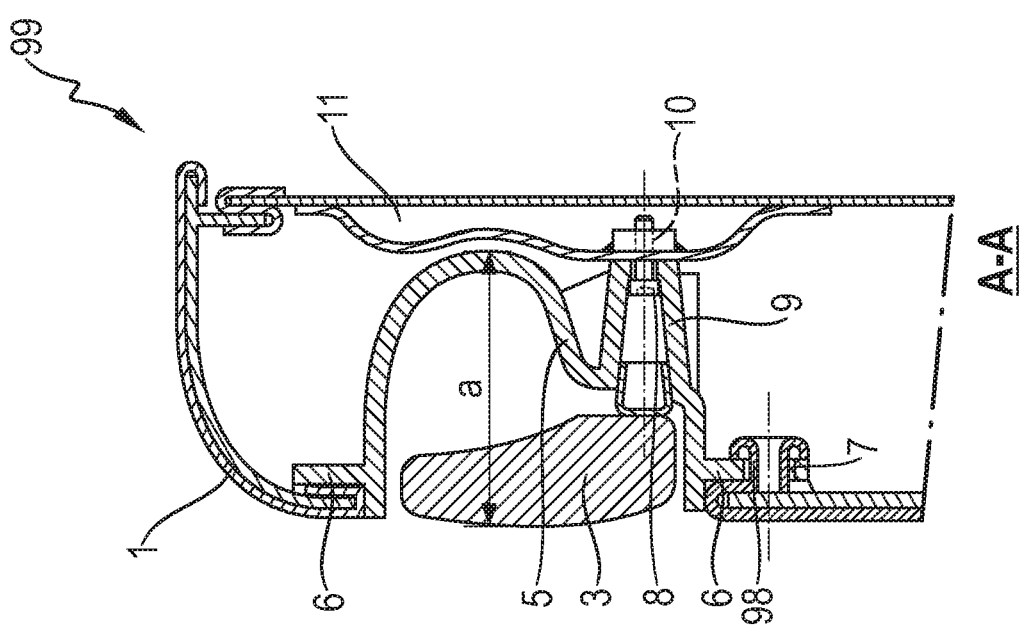
Fig. 1 A-A

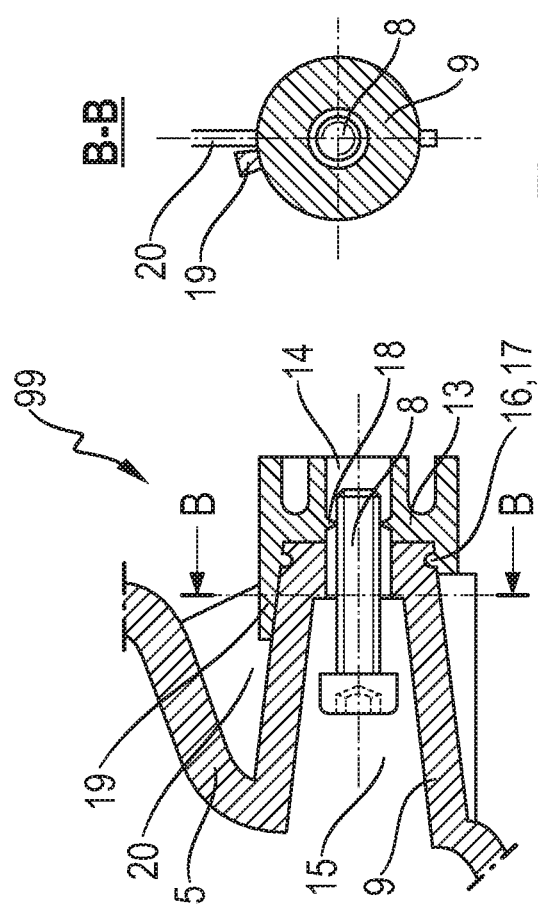
Fig. 4
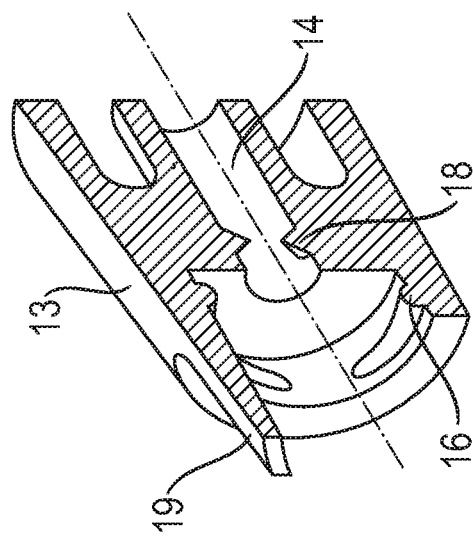
Fig. 5
Fig. 6
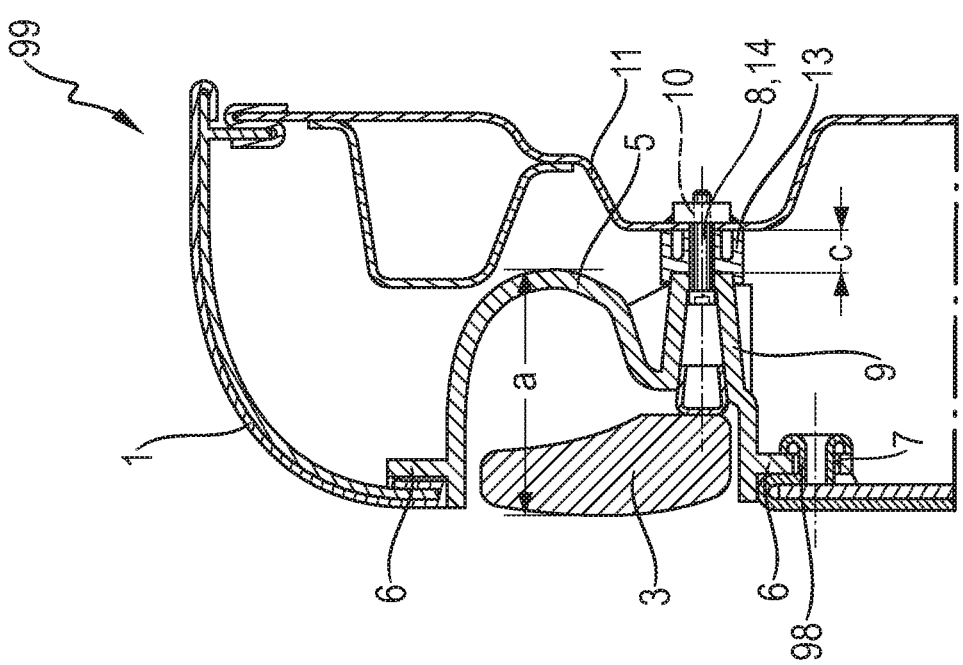
Fig. 3

INSIDE DOOR OPENER ARRANGEMENT

CROSS REFERENCE TO RELATED APPLICATION

This application claims priority under 35 USC 119 to German Patent Appl. No. 10 2019 101 293.7 filed on Jan. 18, 2019, the entire disclosure of which is incorporated herein by reference.

BACKGROUND

Field of the Invention. The invention relates to an inside door opener arrangement for a door of a motor vehicle.

Related Art. Inside door opener arrangements are frequently known in motor vehicles, for example from KR 2001-0059809 A, WO 2014/122835 A1 or U.S. Pat. No. 9,248,722 B2.

Such inside door opener arrangements have a lever that can be actuated manually from the vehicle interior so that the vehicle door can be opened manually. Actuation of the lever typically causes the lock of the vehicle door to be actuated and unlocked by a Bowden cable or a linkage such that the vehicle door can be opened.

An inside door opener arrangement typically is fastened both to an inside door lining and to a door main structure. For this purpose, the distance between the fastening points on the inside door lining and on the door main structure must correspond to the distance of the fastening points on the inside door opener arrangement. Vehicle doors are configured differently, and the door main structures are likely to have varying distance sizes in different vehicle doors. Thus, a standard inside door opener arrangement has to be adapted in each case for fastening to the door main structure. A standardization strategy could lead to greater piece numbers and fewer variants, which reduces the costs overall.

It is therefore the object of the invention to provide an inside door opener arrangement that makes it possible for an inside door opener arrangement to be used in different vehicle doors so that costs can be reduced.

SUMMARY

An exemplary embodiment of the invention relates to an inside door opener arrangement for a vehicle door, with a housing containing a lever that is pivotable about an axis and is connectable to a door lock. The housing has a first fastening element for fastening the housing to a door lining and a second fastening element for fastening the housing to a door structure. A sleeve is provided for the door-specific bridging of the distance between the second fastening element and the door structure. The sleeve is connected to the housing in the region of the second fastening element. Thus, a door-specific use of an otherwise structurally identical inside door opener arrangement is possible merely by selecting an appropriate sleeve that is adapted to the particular vehicle door.

The second fastening element may be a dome-like receptacle for a screw.

The sleeve may be connected to the second fastening element, such as the dome-like receptacle, in a force-fitting and/or form-fitting manner. The sleeve therefore can be arranged securely on the receptacle such that it is not lost.

The sleeve may have a cavity for insertion of a screw. The sleeve thus serves as a holder and channel for the screw.

The sleeve may have projections projecting into the cavity for captively securing the screw. A captive securing means for the screw facilitates the handling.

The projections may be configured in the manner of tabs or pyramids to provide a simple and secure captive securing means.

The sleeve may have a further projection, for rotationally secure contact with a projection of the housing. A rotational movement of the sleeve during the screwing in of the screw therefore is avoided.

The further projection may be configured as a finger, and/or the projection of the housing may be a rib to configure the captive securing means more easily.

The sleeve may have at least one projection that engages in a corresponding receptacle of the dome-like receptacle to achieve a simple form-fitting connection between the receptacle and the sleeve.

The receptacle may define a pocket or a groove. Thus, simple pushing on or latching is possible.

The invention will be explained in more detail below using an exemplary embodiment with reference to the drawings.

BRIEF DESCRIPTION OF THE DRAWINGS

FIG. 1 shows a schematic sectional illustration of an inside door opener arrangement taken along line A-A of FIG. 2.

FIG. 2 is a further illustration of an inside door opener arrangement according to the invention.

FIG. 3 is a schematic illustration of an inside door opener arrangement according to the invention.

FIG. 4 shows a detail of the view according to FIG. 3.

FIG. 5 is a schematic sectional illustration taken along line B-B of FIG. 4.

FIG. 6 shows a schematic partial sectional illustration of a sleeve.

DETAILED DESCRIPTION

FIG. 1 shows a section through an inside door opener arrangement 99 and FIG. 2 shows a top view of such an inside door opener arrangement 99.

FIGS. 1 and 2 show a mechanically operable inside door opener arrangement 99 that is fit into a door lining 1 and has a lever 3. The lever 3 can be rotated about the axis 4 such that, during rotation about the axis 4, a cable pull or a linkage or the like fastened to the lever is actuated so that a door lock of the vehicle door is unlocked, and the vehicle door can be opened.

The lever 3 and other mechanical components, such as the axis 4 or a return spring (not illustrated in FIGS. 1 and 2) for the lever 3 customarily are arranged in a housing 5 as a central component of the inside door opener arrangement 99.

The housing 5 has a flange 6 with openings 7 that receive welding domes, screw connection domes or other pin-like projections 98 of the door lining 1 so that the inside door opener arrangement 99 can be fastened to the door lining 1

The screw 8 in the dome-like receptacle 9 on the housing 5 engages in an internal thread 10 in the door structure 11 and ensures that the forces acting on the vehicle door and on the inside door opener arrangement 99 during actuation of the lever 3 and also in the event of a side impact are not introduced exclusively into the extensive and accordingly relatively flexurally soft door lining 1, but are distributed to the more stable door structure 11.

Thus, a compact construction of the inside door opener arrangement 99 is provided and is characterized by as small an overall dimension "a" as possible between the surfaces of the door lining 1 and the door structure 11.

The small overall dimension "a" leads to a low weight of the inside door opener arrangement 99 and also facilitates a comfortable interior dimension in the shoulder region between the door lining of the driver and the door lining of the passenger.

The narrow configuration because of the small overall dimension leads to the inside door opener arrangement being comprehensively compatible for a vehicle project when there is limited construction space within the vehicle door.

If, in another vehicle door, the distance between the surfaces of the door lining 1 and the door structure 11 is greater than the overall dimension "a" of the inside door opener arrangement 99 of FIG. 1, further measures are necessary to use the inside door opener arrangement 99 of FIG. 1 in such other vehicle doors.

FIGS. 3 to 6 show refinements according to the invention of an inside door opener arrangement and details with regard thereto, in which the inside door opener arrangement 99 is intended to be used in a vehicle door where the distance between the surfaces of the door lining 1 and the door structure 11 has the value a+c.

It becomes clear in FIGS. 3 to 6 that to bridge the additional distance "c", use is made of a sleeve 13, the length of which at least substantially corresponds to the depicted distance "c" and that is indicated along the axis of the screw 8 by "a", for example, cylindrically configured cavity 14 for receiving the screw 8.

The sleeve 13 is a component of the inside door opener arrangement 99 that is fastened to the housing 5 at the free end of the receptacle 9 in a force-fitting and/or form-fitting manner and is used if the size "c" cannot be bridged on the door structure side because the maximum material deformation limits of the door structure 11 have been reached.

An advantage of the invention is the ability to adapt the sleeve 13, which is undemanding geometrically and in terms of manufacturing and tolerances, by a basically cost-effective modification of its length to the distance "c" that is to be bridged between the end side of the receptacle 9 on the predetermined housing 5 of the inside door opener arrangement 99 and the internal thread 10 of the door structure 11 and that potentially varies in different vehicle projects and even in a vehicle project between the driver's door and rear door.

Thus, the sleeve 13 is an adapter part designed for bridging the distance "c" of all the abovementioned modular or standardization strategy of the housing 5 of the inside door opener arrangement 99 with its predefined dimensions in the region of the receptacle 9 for the screw 8 is maintained and second the door structure 11 can be designed and dimensioned without consideration being given to the distance thereof from the end of the receptacle 9 for the screw 8 on the housing 5 of the inside door opener arrangement 99.

In an alternative, the sleeve 13, as shown in FIGS. 4 to 6, is provided with a captive securing function for the screw 8.

The explanations below relate to a sleeve 13 that is fastened to the housing 5 of the inside door opener arrangement 99 in a force-fitting manner and also in a form-fitting manner and optionally also in a force-fitting manner on the end of the receptacle 9 for the screw 8. This can take place, for example, by at least one projection 16 within that space of the sleeve 13 that is taken up by the receptacle 9 on the housing 5 of the inside door opener arrangement 99. The projection 16 points to the cavity 15 of the receptacle 9 and engages in at least one pocket- or groove-like depression 17 that corresponds geometrically to the projection 16. The depression 17 is a receptacle in one of the outer lateral surfaces of the receptacle 9 on the housing 5 of the inside door opener arrangement 99.

Thus, even without the screw 8, the sleeve 13 is fastened reliably to the receptacle 9 on the housing 5 of the inside door opener arrangement 99.

Alternatively, however, the sleeve 13 can be fastened only in a force-fitting manner to the receptacle 9.

The illustrated embodiment further shows an optional captive securing means for the screw 8. In the exemplary embodiment shown, a characteristic of the captive securing means is that at least two projections 18 in the cavity 14 of the sleeve 13 intended for receiving the screw 8 and can be configured as tabs or, according to FIG. 6, as pyramids.

These projections 18 or the tips thereof or the surface center points of their tips generally lie within a plane arranged perpendicular to the axis of the screw 8 and optionally are at the same distance from one another and from the axis of the screw 8. Owing to the fact that the distance of the tips of the projections 18 from the axis of the screw 8 is smaller than half the outside diameter of the threaded stem of the screw 8, an overlap arises between the projections 18 of the sleeve 13 and the screw 8.

If the screw 8 is screwed into the sleeve 13 fixed to the receptacle 9 on the housing 5, the overlap ensures clamping between the threaded stem of the screw 8 and the sleeve 13 because of the plastic deformation at the tips of the projections 18.

After the material-displacing engagement of the threaded stem of the screw 8 with the projections 18 of the sleeve 13, the preassembly can end irrespective of whether the head of the screw 8 is yet supported in the cavity 15 of the receptacle 9, with the result that the screw 8 that is screwed into the sleeve 13 and the receptacle 9 is secured in a force-fitting and form-fitting manner in a preassembly position within the inside door opener arrangement 99.

The projection 19 on the sleeve 13 points to one of the outer lateral surfaces of the receptacle 9 and is designed, for example, in the manner of a finger. The projection 19 forms a form fit, for example in the form of contact, with a projection on the housing 5 of the inside door opener arrangement. The projection can be, for example, a rib 20 and prevents the frictional torque caused by the plastic material displacement at the tips of the projections 18 from leading during the installation of the screw 8 to a rotational relative movement between the receptacle 9 on the housing 5 and the sleeve 13, the relative movement preventing the screwing-in operation.

The symmetry, illustrated in FIG. 6, of the sleeve 13 is a feature of an exemplary embodiment, wherein all of the segments of the sleeve 13 including its outer contour and the cavity 14 can be designed asymmetrically while retaining all of the functions.

The door lining 1 can be equipped prior to its installation on the door structure 11 with a screw 8 that is prefixed captively in the inside door opener arrangement 99 of the door lining 1.

The first advantage resulting therefrom is that the screw 8 is not an individual part that is complicated to procure and to provide on the vehicle production line, but rather is a component of an assembly, namely of the inside door opener arrangement 99 of the door lining 1, that is assigned unambiguously to a use and is integrated captively.

Accordingly, logistic processes for small parts on the vehicle production line are simplified and quality risks in the form of the employees employed there forgetting, losing or confusing the screw 8 for the inside door opener arrangement 99 or damaging the sensitive surfaces of the door lining 1 or the inside door opener arrangement 99 with the screw 8 are eliminated.

A further advantage is simplified ergonomics in the installation of the screw 8. With the introduction of a rotating and preferably mechanically driven screwing tool into the cavity 15 of the receptacle 9 on the housing 5 of the inside door opener arrangement 99, in which cavity the head of the screw 8 fixed in the preassembly position is located, all that is required is a single working step in order to fasten the door lining 1 to the door structure 11 via the inside door opener arrangement 99. This dispenses with the previous working step of having to thread the screw 8 individually, or most unfavorably together with the screwing tool, onto which the head of the screw 8 has previously been placed, into the scarcely visible and ergonomically inaccessible cavity 15 of the receptacle 9. This has a particularly work-facilitating effect if the receptacle 9 on the housing 5 of the inside door opener arrangement, as shown in the figures, is covered by the lever 3 in the inoperative position since this makes it possible for the employee on the vehicle production line in one simultaneous working step to fasten the door lining 1 to the door structure 11 via the inside door opener arrangement 99 by the employee with one hand deflecting the lever 3, which is under tension because of the return spring, while the employee with the other hand simultaneously introduces the rotating screwing tool into the receptacle 9, which has thereby been made accessible, on the housing 5 of the inside door opener arrangement 99 for the final fastening of the screw 8 which has already been prefitted there.

LIST OF REFERENCE SIGNS

1 Door lining
3 Lever
4 Axis
5 Housing
6 Fastening element, receptacle
7 Opening
8 Screw
9 Fastening element, receptacle
10 Internal thread
11 Door structure
13 Sleeve
14 Cavity
15 Cavity
16 Projection
17 Receptacle, depression
18 Projection
19 Projection
20 Projection, rib
98 Projection
99 Inside door opener arrangement

What is claimed is:

1. An inside door opener arrangement for a vehicle door, comprising: a housing containing a lever that is pivotable about an axis and is connectable to a door lock, the housing having a first fastening element for fastening the housing to a door lining and a second fastening element for fastening the housing to a door structure, the second fastening element comprising a receptacle having opposite first and second ends, an inner surface defining a cavity in the receptacle, an outer surface opposite the inner surface, and opposite first and second openings at the respective first and second ends of the second fastening element and communicating with the cavity defined by the inner surface, an attachment screw having a head in the cavity of the receptacle and a shaft passing through the second opening in the receptacle, the inside door opener arrangement further having a sleeve formed separately from the receptacle of the second fastening arrangement and dimensioned to provide door-specific bridging of a distance between the second fastening element and the door structure, the sleeve being mounted over the second end of the receptacle of the second fastening element and extending axially beyond the second end of the receptacle of the second fastening element to a side of the door structure facing the door lining.

2. The inside door opener arrangement of claim 1, wherein the sleeve is connected to the second fastening element in a force-fitting and/or form-fitting manner.

3. The inside door opener arrangement of claim 1, wherein the sleeve has plural spaced apart projections projecting into the cavity for captively securing the shaft of the attachment screw.

4. The inside door opener arrangement of claim 3, wherein the plural projections are configured as plural pyramids.

5. The inside door opener arrangement of claim 4, wherein the sleeve has at least one further projection for rotationally preventive contact with at least one projection on the outer surface of the receptacle of the second fastening member of the housing.

6. The inside door opener arrangement of claim 5, wherein the further projection is a finger projecting toward the door lining, and the projection of the housing is a rib extending along the outer surface of the rib, the finger and the rib preventing rotation between the sleeve and the housing.

7. The inside door opener arrangement of claim 1, wherein the sleeve has at least one projection that projects inward and engages in a corresponding groove in the outer surface of the receptacle of the second fastening element.

8. The inside door opener arrangement of claim 1, wherein the door lining is at an inside position on the vehicle and the door structure is outward of the door lining.

9. The inside door opener arrangement of claim 1, wherein the sleeve releasably engages both the receptacle and the attachment screw for resisting movement of the sleeve and the attachment screw along a direction extending from the second end to the first end of the receptacle.

* * * * *